United States Patent

[11] 3,571,746

| [72] | Inventors | Thomas A. DeTemple;<br>Daniel E. Altman; Myer Geller, San Diego, Calif. |
|---|---|---|
| [21] | Appl. No. | 696,733 |
| [22] | Filed | Jan. 10, 1968 |
| [45] | Patented | Mar. 23, 1971 |
| [73] | Assignee | The United States of America as represented by the Secretary of the Navy |

[54] PULSED LASER APPARATUS
9 Claims, 6 Drawing Figs.

[52] U.S. Cl. ................................................. 331/94.5,
313/217, 315/241, 333/26, 333/84
[51] Int. Cl. ............................................... H01s 3/09
[50] Field of Search ...................................... 331/94.5;
313/217; 315/241; 333/26, 84, (Laser Bibliography), (Chem Abstr), (Star), (AIAA)

[56] References Cited
UNITED STATES PATENTS

| 2,946,923 | 7/1960 | Fitch | 315/241X |
| 3,078,386 | 2/1963 | Fischer | 315/241X |
| 3,211,940 | 10/1965 | Hueschen | 313/217X |
| 3,229,145 | 1/1966 | Jensen | 313/217X |
| 3,311,850 | 3/1967 | Podell | 333/26X |
| 3,320,478 | 5/1967 | Harrison | 313/217X |
| 3,381,139 | 4/1968 | McLeod, Jr. et al. | 307/106 |
| 2,936,390 | 5/1960 | Melhart | 315/241X |

OTHER REFERENCES

Ernest et al. " Giant Optical Pulse Shortening Through Pulse-Transmission Mode Operation of a Ruby Laser," Physics Letters 22, (2), Aug. 1966, pp 147— 9

Kimbark, " Electrical Transmission of Power and Signals," J. Wiley & Sons (New York), 1959, p 221

Geller et al., " A pulsed Coaxial Transmission Line Gas Laser," J. appl. phys. 37, (9), Aug. 1966, pp 3639— 40

*Primary Examiner*—Ronald L. Wibert
*Assistant Examiner*—R. J. Webster
*Attorneys*—R. S. Sciascia, G. J. Rubens and J. W. McLaren ABSTRACT: This improved pulsed gas laser apparatus is preferably employed together with a gas laser cell adapted to be excited to a lasing level by the conduction of pulsed electrical current through the gas contained therein. A number of such gas laser cells in different configurations have been devised and are known in the art. The present invention, however, is not limited by the particular configuration of gas laser cell and may be employed advantageously with a variety of different forms and configurations of gas discharge devices.

A source of electrical power, a pulse-forming network, and switch means are connected in circuit to transmit pulsed electrical current flow from the source of electrical power to the gas laser material. A transmission line of the coaxial, flat parallel plate, or other suitable type may be employed as a pulse-forming network; the pulse-forming network, together with switch means, constitutes a pulse generator assembly for developing pulses of electric current which flow through a gas laser material causing it to produce optimum laser power output relative to the power available from the electrical source. As will appear more fully from the complete disclosure, the apparatus employed within the teaching of the present invention may include a pulse generator having a pulse-forming network which presents an instantaneous dynamic electrical impedance substantially equal to the electrical impedance of the gas medium at the instant of maximum laser power output during pulsed conduction of electrical current therethrough.

PATENTED MAR 23 1971

INVENTORS
THOMAS A. DeTEMPLE
DANIEL E. ALTMAN
BY MYER GELLER

ATTORNEYS

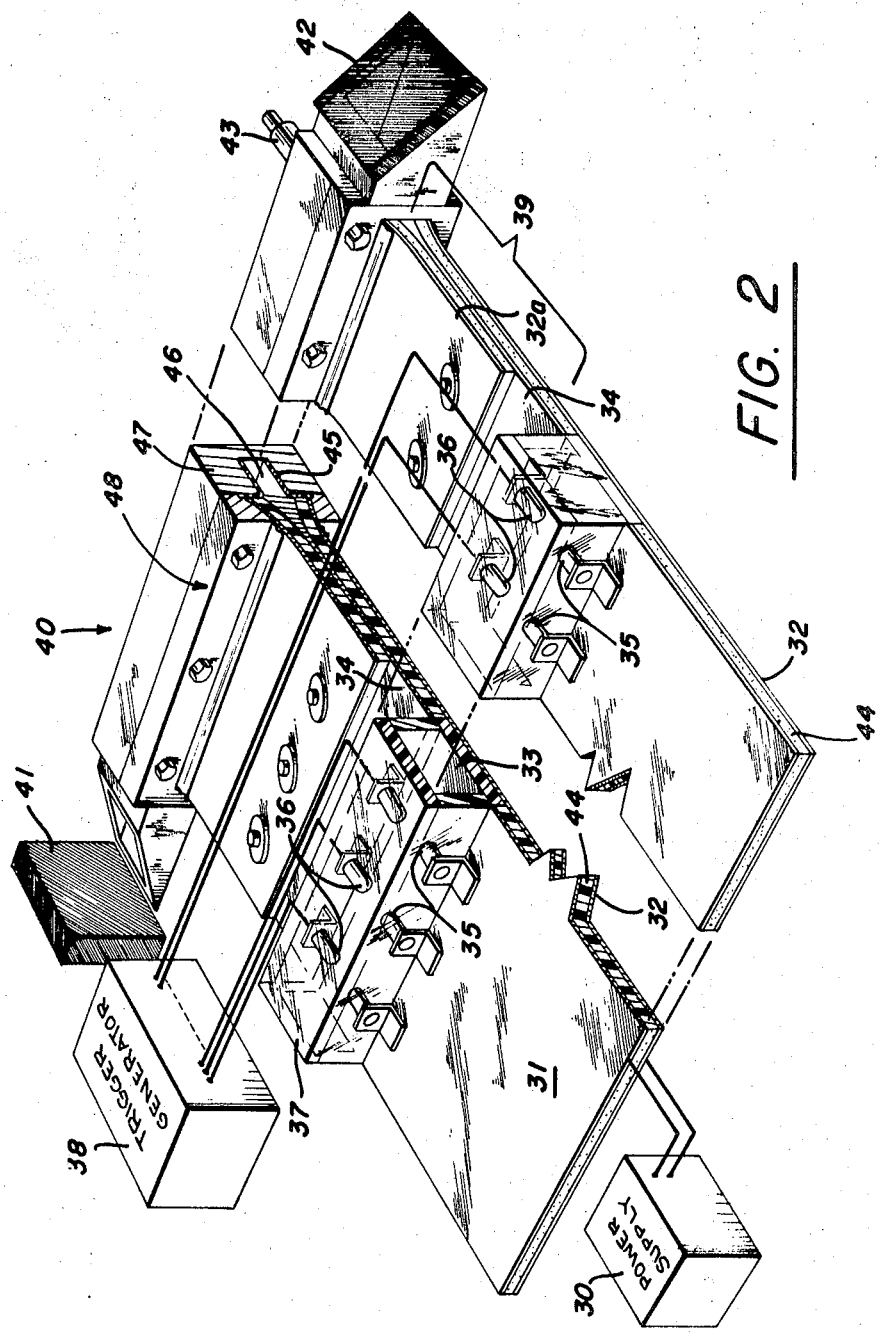

PULSED LASER APPARATUS

The invention described herein may be manufactured and used by or for the Government of the United States of America for governmental purposes without the payment of any royalties thereon or therefor.

CROSS REFERENCES TO RELATED APPLICATIONS

U.S. Pat. No. 3,458,830, titled Transmission Line Gas Laser, filed 18 Oct. 1966, and issued Jul. 29, 1969 in the names of Myer Geller and Daniel E. Altman, discloses a transmission line type of gas laser which may be pulsed and caused to operate most efficiently by employing the teachings and advantages of the present invention. U.S. Pat. No. 3,470,493, titled Laser Energy pump, which employs extension of a coaxial transmission line filed 18 Oct. 1966, and issued Sept. 30, 1969 in the names of Daniel E. Altman and Myer Geller, teaches a unique related concept which lends itself to employment of the advantages and features of the present invention to effect maximum efficiency of operation.

BACKGROUND OF THE INVENTION

In the past, the more conventional pulsed gas lasers have generally been powered and excited by charging a capacitor to a high voltage and then causing the charged capacitor to discharge across the electrodes of a gas plasma tube. This technique of impressing large amounts of electrical energy upon gas lasers has a number of disadvantages and is relatively inadequate and inefficient, even at its optimum performance, for certain types of lasers exhibiting laser action of the type characterized by the action of molecular nitrogen, for example.

The more conventional capacitor discharge technique has the disadvantage of providing an exponential type of current rise time when pulsed. Much effort has been directed to generating a steep rise time form of current pulse.

In order to effect more efficient transfer of electrical power to the gas laser medium, the so-called transmission line type of pulsing apparatus has been devised. This may take several forms, such as the coaxial transmission line gas laser apparatus or the flat-plate transmission line gas laser apparatus. In both these developments, which are typical of the more recent art in pulsed lasers, a pulse-forming network is included which in itself may take a number of different and variant configurations. Connected in circuit with the pulse-forming network, a spark gap switch may be employed having either air or a selected gas medium in the gap between the electrodes. Another form of switch may be the solid dielectric switch in which a material capable of withstanding high electric fields before physical breakdown is disposed between two electrodes.

Regardless of the variant forms of laser cells, tubes, transmission lines, pulse-forming networks, and other related equipment used in the art, the emphasis and effort has in great part been placed upon the objective of transmitting the maximum power during an extremely short period of time from an electrical source to the gas medium causing the lasing action. This, of course, requires that the flow of current through the gas have an extremely high rise time over and during a very short period of time. This requirement, in turn, poses problems of impedance matching comprising both ohmic resistance and reactances, which phenomena occur during the high rise time of the short, but extremely high amplitude, current pulses. Overall, one of the most important desiderata in achieving optimum laser operation is to produce the maximum laser power output relative to the amount of electrical power which is employed to excite the laser material.

SUMMARY OF THE INVENTION

The present invention is directed to an improved pulsed laser apparatus which comprises a laser material adapted to be excited to a lasing level by the conduction of pulsed electrical current through a gas medium. The gas medium, of course, may take the form of a gas plasma contained within an appropriate cell or similar constricting vessel. A source of electrical power is provided and a pulse-forming network is connected to transmit electrical energy from the source of electrical power to a switch. The pulse-forming network and switch are connected for generating pulses of electrical current flow through the gas medium. The switch may comprise a controllable spark gap, operative in a selected gas medium, such as nitrogen, for example, or any other convenient and desirable gas. In accordance with the teachings of the present invention, the apparatus, operative as a pulse-forming network and switch connected in circuit with the gas medium, is designed and caused top to present an instantaneous electrical impedance including its ohmic resistance together with dynamic reactances, substantially equal to the impedance of the gas medium at the instant of maximum laser output during pulsed conduction of electrical current therethrough.

Accordingly, it is a primary object of the present invention to provide an improved pulsed gas laser apparatus which affords maximum laser power output relative to the amount of energy input impressed upon the apparatus in the form of electrical power.

Yet another important object of the present invention is to provide an improved pulsed gas laser apparatus which is particularly adapted to maximize the efficiency of power transmission from an electrical power source through a transmission line configuration of circuit constituting an appropriate pulse-forming network.

A more specific object of the present invention is to provide an improved pulsed gas laser apparatus which is particularly adapted for operation with a transmission line of the parallel, flat-plate type.

Another important object of the present invention is to provide an improved pulsed gas laser apparatus which is readily adaptable to significantly increase the efficiency of operation of a transmission line type of gas laser employing a coaxial transmission line and a coaxial spark gap switch as a pulse generator.

A further general object of the present invention is to provide a pulsed gas laser apparatus capable of providing greater laser power outputs from relatively limited electrical power sources as contrasted to power sources required to produce comparable laser power outputs in the known prior art.

An ancillary but equally important object of the present invention is to provide an apparatus capable of pulsing a gas material by electrical conduction therethrough for exciting an associated gas, liquid or solid laser to lasing level with optimum efficiency relative to the power input employed.

These and other advantages, features, and improvements of the present invention will be more fully appreciated from an understanding of the description of several embodiments which follows, when taken together with the accompanying drawings, and the scope of the invention will be pointed out more particularly in the appended claims.

BRIEF DESCRIPTION OF THE DRAWINGS

In the Drawings:

FIG. 2 is a perspective illustration showing a parallel plate, transmission line type of pulsed gas laser employing the present invention.

Figure 1:
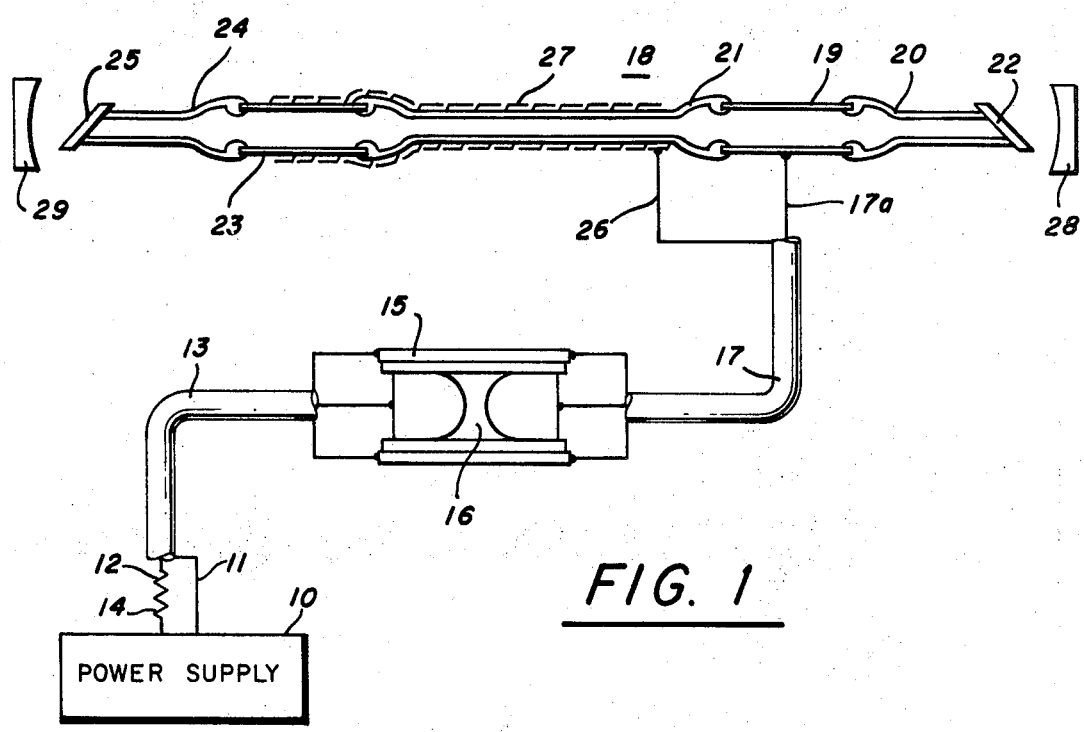
FIG. 1 is a partially cross-sectional illustration of a coaxial transmission line type of pulsed gas laser embodying the present invention.

The concepts and teachings of the present invention may be advantageously employed in gas lasers, liquid lasers, and solid state laser materials as well. Additionally, the concept of the present invention is applicable to a laser material such as a liquid, for example, which is excited by a flash lamp or tube operated in conformance with the teachings of the present invention. For purposes of illustration, however, the several preferred embodiments illustrated in the drawings depict the use of the present invention in conjunction with pulsed gas lasers.

DESCRIPTION OF THE PREFERRED EMBODIMENTS

FIG. 1 illustrates the employment of the present invention in connection with the operation of a coaxial, transmission line, pulsed gas laser of the type disclosed in U.S. Pat. application Ser. No. 588,249, referred to previously. In FIG. 1 there is shown a power supply 10, which is a conventional source of electrical energy. The power supply 10 is connected through appropriate electrical conductors 11 and 12 to a plurality of coaxial cables represented at 13. An appropriate resistance 14 may be connected in circuit between the power supply 10 and the inner conductors of the plurality of coaxial cables 13 connected in parallel.

The coaxial cables 13 are connected to a coaxial spark gap switch 15 which performs the function of building up a relatively high voltage before the spark gap is broken down so that conduction takes place and a pulse of electrical energy is passed through the coaxial spark gap switch. In a typical preferred embodiment, the coaxial spark gap switch 15 may be contained within a suitable gas environment such as nitrogen in the spark gap area 16. The use of a gas, such as nitrogen, has several advantages including that of minimizing deterioration, corrosion, etc. which may otherwise occur. Additionally, its use affords relatively precise control of the point in time when conduction takes place across the spark gap. By an appropriate auxiliary electrical source connected to the spark gap, conduction thereacross may be triggered as desired.

The output side of the coaxial spark gap switch 15 is connected to a second plurality of coaxial cables 17 connected in parallel. In a typical embodiment, the number of coaxial cables 17, connected in parallel as shown, may be the same in number as the plurality of coaxial cables 14 connected in parallel, though such an arrangement is not a prerequisite or absolute requirement of the concept and teaching of the present invention.

The plurality of coaxial cables 17 connected in parallel as shown are, in turn, connected to a laser assembly 18. The laser assembly 18 embodies the teachings and concepts disclosed in the previously referenced U.S. Pats. Nos. 3,458,830 and 3,470,493.

The internal conductors 17a of the plurality of coaxial cables 17 are connected in parallel to a copper electrode 19 which is part of the laser assembly 18 as shown in cross-sectional view in the illustration of FIG. 1. The copper electrode 19, in the form of an elongate annular shape, is sealed at either end to a glass section of tubular configuration as shown at 20 and 21. The glass tubular section 20 is sealed at its remaining end to a Brewster window, preferably as shown at 22. The other glass tubular section 21 extends along the axis of the laser assembly 18 in an elongate tubular form and is sealed to a second copper electrode 23.

The second copper electrode 23 is similar in shape and configuration to the previously described first copper elector electrode 19. Another section of glass tubing 24 is sealed to the end of the copper electrode 23, and the assembly is sealed at the end of the glass tube section 24, preferably to a Brewster window 25.

The electrical circuit to the laser assembly 18 is completed by a connection 26 which forms an electrical path from the external conductors 17b of the plurality of coaxial cables 17 to a braided shield electrical conductor 27 which encloses the elongate portion of the glass tubing 21. This arrangement completes an electrical path from the outside or external conductors 17a of the plurality of coaxial cables 17 to the second copper electrode 23.

To complete the assembly, a mirror 28 may be positioned at one end of the laser assembly 18 oriented appropriately with respect to its long axis as shown. The mirror 28 is substantially totally reflective and at the opposite end of the laser assembly 18 a similar configuration of mirror 29 may be positioned as shown. However, such mirror is preferably only partially reflective so that the laser beam, when generated, may pass therethrough.

The advantages and operational features of the coaxial transmission line pulsed gas laser as illustrated in FIG. 1 are disclosed and described in detail in the previously mentioned U.S. Pat. No. 3,458,830. In operation, such coaxial, transmission line, pulsed gas laser performs with optimum efficiency when the maximum amount of energy is transferred from the power supply 10 to the gas laser material contained within the laser assembly 18, such as nitrogen, for example. Electrical energy may be transmitted by reason of the buildup of voltage at the coaxial spark gap switch 15 to a point where the spark gap breaks down in the general area 16, and conduction takes place, causing a pulse of electrical energy to travel from the internal conductors 17a of the plurality of coaxial cables 17, down the long axis of the laser assembly 18 to the ground connection, which in this case comprises the copper electrode 23 at the opposite end of the laser assembly 18.

In accordance with the concept of the present invention, the instantaneous dynamic impedance of the pulse-forming network, the switch means, and the electrically conductive path "seen" by the laser assembly is made to be substantially equal to the instantaneous dynamic impedance of the conductive material, (i.e. nitrogen gas contained within the laser assembly 18) at maximum laser power output from the laser cell.

The effective, instantaneous, dynamic electrical impedance presented to the excited material in accordance with the teaching of the present invention, may be varied to the desired instantaneous value in a number of different ways; for example, it may be possible to vary the number of coaxial cables which are connected in parallel, as shown at 13 and 17, until the desired instantaneous, dynamic impedance "seen" by the excited material is realized at the instant of maximum laser power output. Accordingly, a significantly higher order of efficiency is realized by reason of the optimum transmission of electrical energy from the power supply to the lasing material.

FIG. 2 shows a parallel plate, transmission line, pulsed gas laser which is a variant form of pulsed gas laser relative to other forms in the art such as the coaxial, transmission line, pulsed gas laser described in connection with the illustration of FIG. 1. The apparatus shown in FIG. 2 comprises a power supply 30 connected to two electrically conductive parallel plates 31 and 32. Positioned between the conductive parallel plates is a nonconductive insulating material such as shown at 33 which may comprise material commercially known as Mylar, for instance. The parallel plate 31 has a counterpart in continuation as shown at 34 leaving a gap between itself and the parallel plate 31. The other parallel conductive plate 32, however, is continuous as illustrated in FIG. 2. Disposed on either side of the nonconductive gap formed between plates 31 and 34 are two juxtaposed pluralities of electrodes 35 and 36. The two pluralities of juxtaposed electrodes 35 and 36 form a plurality of spark gaps as illustrated in FIG. 2 and the entire arrangement is enclosed preferably within a suitable chamber 37 which may contain an appropriate gas such as nitrogen, operative in the manner previously described in connection with the embodiment illustrated in FIG. 1. A trigger generator 38 is connected in parallel to the plurality of electrodes 36 so that the spark gap formed between adjacent pluralities of electrodes may be broken down at a desired time, to initiate conduction and thereby cause a pulse of electrical energy to be transmitted to the laser material. The pulses are transmitted through a balun line portion of the apparatus indicated generally at 39.

Figure 3:
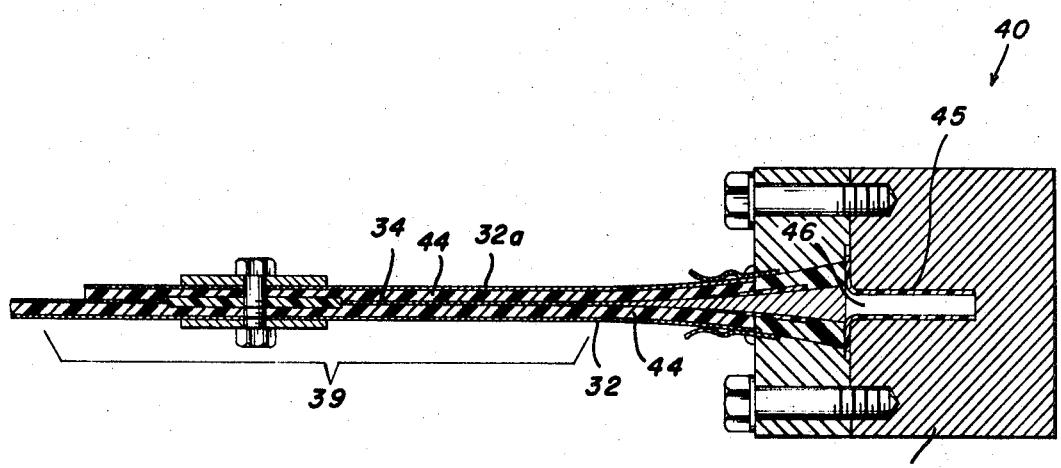
FIG. 3 is a cross-sectional view of a portion of the embodiment of the present invention illustrated in FIG. 2.

In the configuration illustrated in FIG. 2, the laser tube is an elongate rectangular or square sectioned enclosure 40, preferably having a totally reflective mirror 41 at one end and a partially reflective mirror 42 at the opposite end through which the laser energy output is directed. The laser cell assembly 40 may be connected to receive nitrogen or other suitable gas through the connection as shown at 43. The operation of such a parallel plate transmission line pulsed gas laser may be understood more fully from the illustration of FIG. 3 which shows a part of the entire assembly of FIG. 2 in a cross section view. As shown in FIG. 3, the balun line portion of the assembly of FIG. 2 effectively comprises a transition from a single ground plane to a double ground plane for purposes of desired symmetry, the requirement for which will appear more fully from the description which follows.

The conductive parallel plate 34 is shown in a central position in the balun line portion 39. In parallel relationship on either side of the central parallel plate 34, there is disposed the parallel plate 32 and its counterpart on the opposite side parallel plate 32a. The conductive electrical plates 34, 32, and 32a are insulated from each other by appropriately positioned layers of insulating nonconductive material such as Mylar as shown at 44. The laser tube assembly 40 is shown in cross section and its interior is illustrated as having a symmetrically-shaped, slotted member 45 which may be of a suitable nonconductive material such as Teflon. When the spark gap of the assembly shown in FIG. 2 is caused to conduct, a current path is formed down the central conductor 34, which performs in the manner of an anode, through the slot 46 of the elongate, slotted Teflon member 45, conducted by the nitrogen or similar gas as contained therein, through the electrically conductive body members 47 and 48, and to the ground parallel plate conductors 32a and 32 to form a complete circuit with the electrical power source 30. Thus, an essentially instantaneous, elongate conduction path is created throughout the length of the laser tube assembly 40 and laser energy is emitted out the partially reflective mirror or Brewster window 42.

One of the prime objectives of the development of such configurations as the coaxial transmission line pulsed gas laser and the parallel plate transmission line pulsed gas laser as shown in FIGS. 1, 2, and 3 is the realization of greater laser power outputs. It will be readily recognized by one skilled in the art that such configurations, because of inherent physical limitation, must necessarily be bound by definite maximum realizable outputs of laser energy. Accordingly, the present invention contributes significantly to increased laser energy output by solving an inherent laser problem. The present invention conceives and teaches how a significantly more substantial amount of electrical energy may be transmitted and imparted to the lasing material relative to the available energy with the result and that comparatively greater laser energy output is produced. This is achieved primarily by matching the instantaneous electrical impedance of the apparatus connecting the electrical power supply to the gas medium to be substantially that of the conductive path through the gas at a particular condition.

When the gas is pulsed with electrical energy, it becomes conductive and the gas itself represents a varying, dynamic electrical impedance. The particular instantaneous electrical impedance value for optimum results is the dynamic electrical impedance of the gas during its pulsed conduction at the instant of maximum laser power output. This electrical impedance value is not the minimum impedance as will be explained and illustrated more fully hereinafter.

As was previously noted, the impedance may be matched as desired in the case of coaxial transmission line pulsed gas laser by varying the number of coaxial cables which are employed in parallel electrical connection. In the case of the flat-plate transmission line pulsed gas laser, as shown in FIGS. 2 and 3, the impedance of the electrical connections comprising the several conductive parallel plates may be varied by the amount of insulation which is employed therebetween, such as sheets of Mylar, for example. In a typical embodiment of the present invention, in the form of a flat-plate transmission line pulsed gas laser, multiple sheets of Mylar insulation were employed between adjacent parallel plates and varied to adjust the dynamic electrical impedance of the apparatus so that the excited material, such as a gas, "sees" an instantaneous electrical impedance substantially equal to the instantaneous impedance of the conductive gas at maximum laser power output.

Figure 4A:
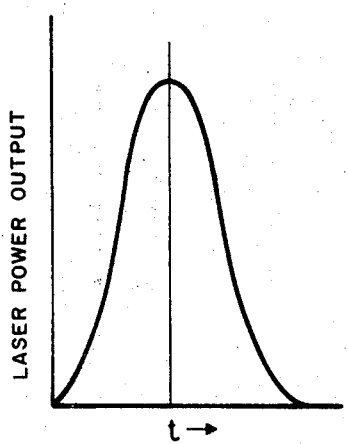
FIGS. 4a and 4b are graphical illustrations of the typical relationships between laser power output and impedance of the gas medium with respect to time during its pulsed conduction of electrical current therethrough.
Figure 4B:
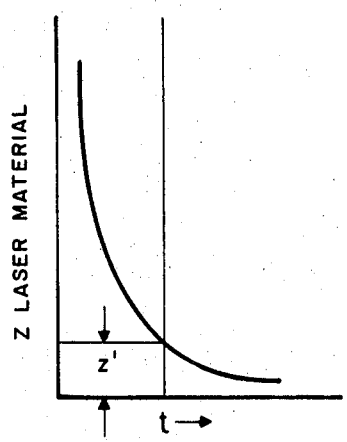

This necessary relationship as taught and conceived by the present invention, is illustrated more clearly in FIGS. 4a and 4b which depict a typical laser power output against time and the correlative impedance of the pulsed gas medium against the same time scale. As shown in FIG. 4a, the laser power output has an extremely high rise time, reaching a maximum usually in a period of the order of less than 1 nanosecond. During conduction through the gas material when laser energy output is being realized, the conducting gas material changes in its effective electrical impedance. This relationship is shown in FIG. 4b against the same time scale. The electrical impedance of the conducting gas material is shown on the ordinate, and the time scale of the abscissa is the is the same as that of the FIG. 4a. It will be seen that the impedance has a sharp drop as the laser material begins to produce laser energy output and reaches a relatively low point, though not its absolute minimum, when the laser power output is at a maximum. It is at this value of impedance, $Z'$, as indicated in the illustration of FIG. 4b, which the instantaneous impedance of the apparatus has to be matched in order to achieve the desired results in accordance with the concept of the present invention. The impedance may be varied so as to closely approximate the desired value of impedance $Z'$ in accordance with the methods described previously which are applicable to the preferred embodiments illustrated in FIGS. 1, 2, and 3.

Figure 5:
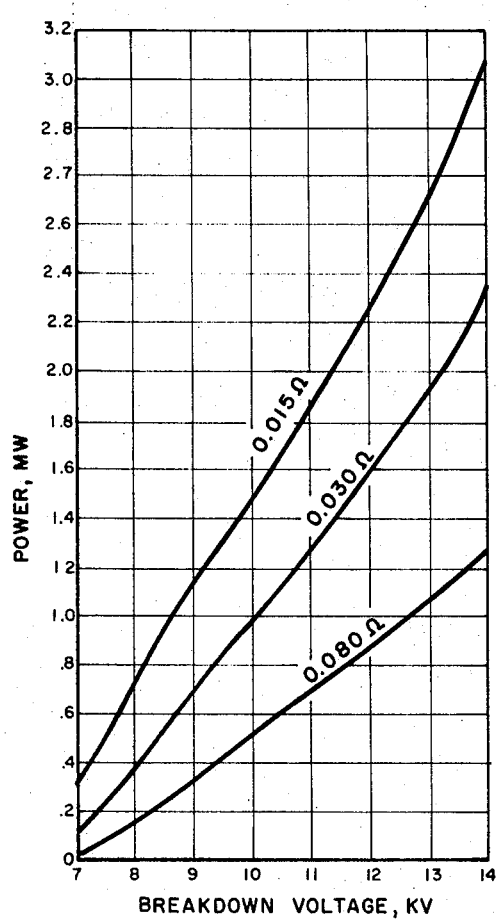
FIG. 5 is a graphical illustration of the significant degree of improvement of power output realized relative to power input in a typical parallel plate type of pulsed gas laser employing the teachings of the present invention.

FIG. 5 illustrates how a typical parallel plate, pulsed gas laser employing nitrogen as the lasing material may be improved by matching impedances as taught and conceived by the present invention. In FIG. 5, laser output power is shown in megawatts on the ordinate for varying breakdown voltages of the nitrogen gas represented on the abscissa. The three graphs show relationships in power output developed for three different values of impedance, as indicated 0.080 ohms impedance, 0.030 ohms impedance, and the most desired condition of 0.015 ohms impedance. It can be seen from FIG. 5 that the improvement in operation effected in accordance with the teachings and concepts of the present invention, is a most significant one which transcends by several orders the amount of laser power output which may be otherwise realized.

It is known from empirical results, for example, that the present invention, when employed in a parallel plate, transmission line, pulsed gas laser having a laser tube approximately 1 meter in length and supplied from a 30 kilovolt power supply can produce laser power output of approximately 2.5 megawatts. By contrast, a similarly configured flat-plate, transmission line, pulsed gas laser also employing nitrogen as the lasing material but having a greater length laser cell by a factor of two, i.e. approximately 2 meters long, required an electrical energy source of 160 kilovolts to produce a comparable 2.5 megawatts laser power output by prior art technique.

In applying the teaching and concept of the present invention it must be appreciated that a laser material such as gas has a dynamic impedance value in terms of its electrical characteristics which vary widely from the instant an initial voltage is applied to it to the point in time some nanoseconds later when it begins to conduct. At the very instant an initial voltage is applied to a gas laser material, it represents virtually an infinite impedance whereas once the gas has been broken down to form a conductive path therethrough it presents relatively very little impedance. Accordingly, the desired impedance matching as taught by the concept of the present invention must be one where the impedance of the electrical circuit which the lasing material "looks into" represents an impedance substantially equal to the instantaneous impedance value of the dynamically changing impedance of the lasing material when it is producing maximum laser power output.

In practice, it has been found that some considerable difficulties may be encountered when impedance matching is sought to be achieved by changing one or more parameters in electrical circuitry which supplies the electrical energy to the lasing material. Much of the difficulty may occur because any change in one of several parameters will cause changes in all or many related parameters.

In some instances, particularly where a flat-plate configuration of laser is employed of the general type illustrated in FIGS. 2 and 3, it may be possible, and perhaps preferable, to vary the impedance value represented by the lasing material itself. This can be accomplished by varying the electrically conductive path which must be completed through the lasing material to cause it to generate laser power output. It has been found that much less disturbance to the remaining electrical parameters and operative characteristics of the laser assembly will be likely to occur if only the conductive path and thus the equivalent electrical characteristics of the lasing material itself are varied to achieve a condition of substantial instantaneous match of the dynamic impedance values involved.

When the teaching of the present invention is practiced in connection with equipment employing a pulse charging coupling as disclosed in our copending patent application, the laser material "sees" the instantaneous impedance of the pulse charging coupling at the instant when the lasing material begins to conduct. It is substantially at this point that the instantaneous impedance value of the coupling should be substantially matched and equal to the instantaneous impedance value of the dynamically changing impedance of the conductive lasing material.

While the present invention has been described and illustrated in terms of pulsed gas lasers, its teachings may be advantageously applied to liquid lasers, particularly where such liquid lasers are caused to produce a laser energy output by means of a gas flash tube. The present invention may also be advantageously used and its teachings employed readily as applied to lasing materials such as semiconductors as is well known in the laser art.

Obviously many modifications and variations of the present invention are possible in the light of the above teachings. It is therefore to be understood that within the scope of the appended claims the invention may be practiced otherwise than as specifically described.

We claim:
1. An improved apparatus for exciting a laser material comprising:
   a gas energizable by the conduction of pulsed electrical current for producing laser excitation energy;
   a source of electrical power;
   a pulse-forming network connected to said source of electrical power;
   switch means connected to said pulse-forming network for periodically conducting pulses of electrical current flow from said network; and
   a transmission line defining a first conductive path from said switch means to said gas and a second conductive return path from said gas to said switch means, said conductive paths having insulation therebetween of a minimum strength to withstand the potential applied to cause said gas to break down, for optimizing the impedance of said transmission line relative to the dynamic impedance of said gas during pulsed conduction therethrough.

2. An improved apparatus for exciting a laser material as claimed in claim 1 wherein said pulse-forming network comprises a transmission line input circuit.

3. An improved apparatus for exciting a laser material as claimed in claim 1 wherein said switch means is a spark gap switch.

4. An improved apparatus for exciting a laser material as claimed in claim 3 wherein said spark gap switch is controllably actuated by an independent trigger means.

5. An improved apparatus for exciting a laser material as claimed in claim 3 wherein said spark gap switch is operative in a contained medium of a selected gas.

6. An improved apparatus for exciting a laser material as claimed in claim 2 wherein said pulse-forming network is in the form of coaxial cable and said switch means is a coaxial spark gap switch.

7. An improved apparatus for exciting a laser material as claimed in claim 1 wherein said pulse-forming network is in the form of parallel conductive plates.

8. An improved apparatus for exciting a laser material as claimed in claim 5 wherein said electrically conductive path includes a balun line portion.

9. An improved apparatus for exciting a laser material as claimed in claim 8 wherein said gas is contained in a laser cell connected to a dual ground plane balun line portion of a conductive path for said pulses.